(12) United States Patent
Rings et al.

(10) Patent No.: US 12,539,822 B2
(45) Date of Patent: Feb. 3, 2026

(54) SEATBELT RETRACTOR UNIT AND VEHICLE HAVING A SEATBELT RETRACTOR UNIT OF THIS TYPE

(71) Applicant: Autoliv Development AB, Vargarda (SE)

(72) Inventors: Philip Rings, Norderstedt (DE); Fooke Kutscher, Elmshorn (DE)

(73) Assignee: Autoliv Development AB, Vargarda (SE)

( * ) Notice: Subject to any disclaimer, the term of this patent is extended or adjusted under 35 U.S.C. 154(b) by 243 days.

(21) Appl. No.: 18/548,759

(22) PCT Filed: Feb. 24, 2022

(86) PCT No.: PCT/EP2022/054618
§ 371 (c)(1),
(2) Date: Sep. 1, 2023

(87) PCT Pub. No.: WO2022/184538
PCT Pub. Date: Sep. 9, 2022

(65) Prior Publication Data
US 2024/0140356 A1    May 2, 2024

(30) Foreign Application Priority Data
Mar. 4, 2021  (DE) ..................... 10 2021 105 276.9

(51) Int. Cl.
*B60R 22/343*    (2006.01)
*H02M 3/04*    (2006.01)

(52) U.S. Cl.
CPC ............. *B60R 22/343* (2013.01); *H02M 3/04* (2013.01)

(58) Field of Classification Search
CPC .............. B60R 22/343; B60R 22/3405; B60R 2021/01204
See application file for complete search history.

(56) References Cited

U.S. PATENT DOCUMENTS

| 4,355,277 A | 10/1982 | Davis et al. |
| 6,447,012 B2 * | 9/2002 | Peter ..................... B60R 22/343 242/390.8 |

(Continued)

FOREIGN PATENT DOCUMENTS

| DE | 2809395 A1 | 9/1979 |
| DE | 102019214388 A1 | 3/2021 |

(Continued)

*Primary Examiner* — Sang K Kim
(74) *Attorney, Agent, or Firm* — Dickinson Wright PLLC

(57) ABSTRACT

A belt retractor unit with a housing, a belt reel rotatably mounted in this housing, a blocking unit for blocking the belt reel against the housing, wherein the blocking unit has an actuator unit with an electromagnet and a control apparatus for controlling the electromagnet, which has a power input, a power output connected to the electromagnet and at least one signal input for receiving a control signal and/or a sensor unit for generating a control signal, wherein the control apparatus has at least a first active switching state and a passive switching state, wherein in the first active switching state an electric current flows between the power output and the electromagnet, the current intensity of which is greater than in the passive switching state, wherein the control apparatus has between the power input and the power output at least one DC/DC converter acting as a constant current source, so that the current intensity in the first active switching state has a defined first value independent of the voltage applied to the power input.

10 Claims, 2 Drawing Sheets

(56) References Cited

U.S. PATENT DOCUMENTS

Figure 4B:
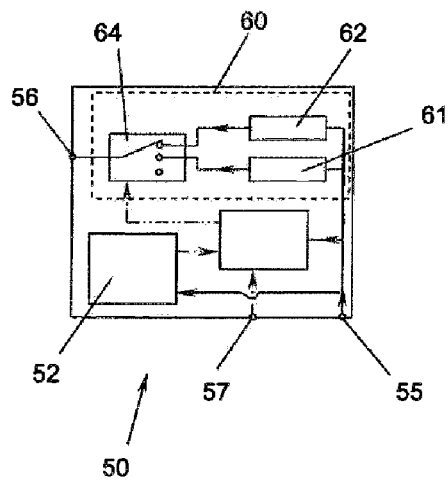

| | | | | |
|---|---|---|---|---|
| 6,755,369 | B2* | 6/2004 | Holbein | B60R 22/343 |
| | | | | 242/384 |
| 12,319,226 | B2* | 6/2025 | Rings | B60R 22/343 |
| 2015/0171751 | A1 | 6/2015 | Friebe et al. | |
| 2022/0332280 | A1 | 10/2022 | Glaesser et al. | |

FOREIGN PATENT DOCUMENTS

| | | |
|---|---|---|
| EP | 0460494 A1 | 12/1991 |
| EP | 1382495 A1 | 1/2004 |
| GB | 2398824 B | 9/2005 |
| WO | 8201288 A1 | 4/1982 |
| WO | 2014019946 A2 | 2/2014 |

* cited by examiner

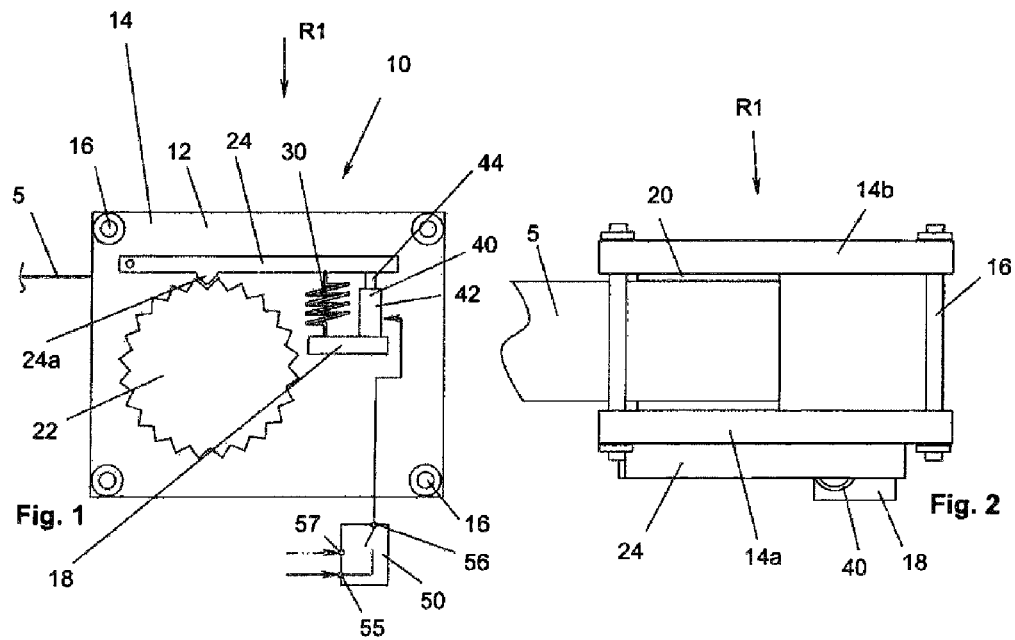
Fig. 1
Fig. 2
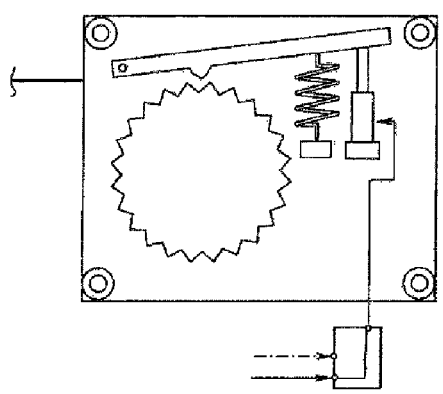
Fig. 3
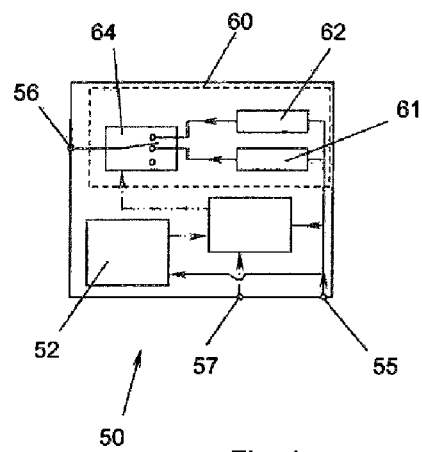
Fig. 4a

SEATBELT RETRACTOR UNIT AND VEHICLE HAVING A SEATBELT RETRACTOR UNIT OF THIS TYPE

The invention relates to a belt retractor unit according to the preamble of claim 1, and to a vehicle with such a belt retractor unit according to claim 10.

Every modern passenger car, but also most trucks, buses and the like have seat belt systems. Such a safety belt system always has a belt retractor unit, which in turn has a belt retractor with a housing and a belt reel rotatably mounted in this housing. A part of the safety belt system strap is wound on this belt reel and the user can unwind it from the belt reel against the force of a return spring acting between the belt reel and the housing. A blocking apparatus is further provided which has a release state in which the belt spool is not blocked against the housing and a blocking state in which the belt spool is blocked against the housing. This blocking apparatus usually has two independent sensors, namely a belt-sensitive sensor, which senses the rotation of the belt reel, and a vehicle-sensitive sensor, which senses the vehicle position and/or the vehicle acceleration (in particular the negative vehicle acceleration, i.e. deceleration). In normal driving conditions, i.e., when the strap is not extended too quickly and the vehicle is not in an unusual layer or experiencing unusual acceleration, the blocking apparatus is in its unblocked state and the user can extend the strap, allowing relatively free movement. However, if the strap is extended too quickly and/or if the vehicle decelerates too quickly, for example, the blocking apparatus goes into its blocked state.

Currently, the blocking apparatuses are mostly completely mechanically designed, which means that the complete blocking apparatus (including the sensors) is rigidly connected to the housing of the belt retractor. However, this rigid connection of the entire blocking apparatus to the housing has disad-vantages, particularly if the belt retractor unit is fastened to the vehicle seat, in particular its backrest, since in this case the position of the belt retractor and thus also of the vehicle-sensitive sensor can change relative to the vehicle.

For this reason, belt retractor units that operate completely or partially electrically have become known, the blocking apparatus of which has a blocking unit connected to the housing with an electromagnet and a control apparatus for controlling the electromagnet. This electromagnet is part of an electrically controllable actuator unit in such a way that the state of the actuator unit (particularly currentless or current-carrying) determines the state of the blocking unit (belt coil rotatable or belt coil blocked). Normally, the blocking unit also has a return element (usually in the form of a spring) that counteracts the electromagnet. This reset element can be part of the actuator unit. For safety reasons (fail safe), the currentless state is usually the blocked state and the energized state is the unlocked state. Accordingly, the control apparatus driving the actuator unit, which has a power input connected to the vehicle electrical system and a power output connected to the electromagnet, has a passive switching state in which the power supply from the power input to the power output is interrupted, and an active switching state in which the power input is connected to the power output and therefore current flows through the electromagnet. This control apparatus, which is generally coupled to the blocking unit exclusively electrically, can in this case be arranged in any location on the vehicle, in particular in such a manner that it does not move with the backrest. A generic belt retractor unit with such a blocking unit and such a control apparatus is described, for example, in GB 23 98 824 B. Such electrically operating belt retractor units have other advantages as they offer more possibilities to control the state of the belt retractor unit (blocked/not blocked).

A disadvantage of such a generic belt retractor unit is, of course, that it increases the power consumption of the vehicle compared to a purely mechanically operating belt retractor unit. This is all the more true since it is normally preferred—or even required—that the belt retractor unit be in the locked state when in the currentless state, i.e., when no current is flowing through the electromagnet. This means that during normal driving operation, in which the belt retractor unit is naturally in its unlocked state, current flows through the electromagnet, thus creating a permanent additional electrical consumer while the vehicle is in operation. Of course, this is already undesirable in an ordinary combustion engine vehicle, as it permanently increases the load on the alter-nator, which in itself increases the overall energy consumption of the vehicle. Of course, the problem is exacerbated in the case of fully or partially electrically powered vehicles, as increased power consumption has a negative impact on the range in electric mode.

Based on this, the object of the present invention is to improve a generic belt retractor unit so as to reduce its power consumption.

This object is solved by a belt retractor unit having the features of claim 1. A vehicle having such a belt retractor unit is disclosed in claim 10.

The force which an electromagnet exerts on a magnetic element depends, for a given geometry, exclusively on the strength of the current flowing through the electromagnet (i.e. its winding). The winding of such an electromagnet substantially represents an ohmic resistor, so that the current strength depends linearly on the applied voltage. In order to keep the blocking unit in its state when the electromagnet is energized by a storm, the electromagnet must exert a minimum force on the element to which it is applied, which in turn means that it must be ensured that a current with a minimum amperage flows through the electromagnet. If the vehicle's on-board voltage is simply applied to the electromagnet, as has been the case in prior art, the electromagnet must be designed in such a way that the holding force is still reliably given even when the on-board voltage has reached its permissible minimum value. It should be noted that the on-board voltage of a vehicle can fluctuate in a relatively wide area, in particular depending on the state of charge of the battery. However, this means that when the on-board voltage is in its regular, or upper, area, more current than necessary flows through the solenoid, consuming un-necessary power.

According to the invention, the control apparatus therefore has between its power input and its power output at least one DC/DC converter acting as a constant current source, so that the current intensity in a first active switching state has a defined first value independent of the voltage applied to the power input. Such DC-DC converters, which act as a constant current source, are widely used in technology, have a high efficiency and are also very inexpensive in the power range relevant here.

By using a DC-DC converter acting as a constant current source, the electromagnet of the actuator unit receives only as much current "as it needs", thus saving power compared to the prior art.

Typically, the first value of the current is between 50 mA and 500 mA.

In a particularly preferred embodiment, the control apparatus has not one but two active switching states, wherein the current intensity in the second active switching state has a higher value than in the first active switching state. Preferably, the current intensity also has a defined second value in this second active switching state; this is greater than the first value. This particularly preferred embodiment of the invention is based on the following consideration: if the control apparatus switches from the passive switching state to an active switching state, the electromagnet of the actuator unit is to move a movable element from a first position to a second position. As a rule, this movement means unlocking of the blocking unit. Thereafter, the blocking unit usually remains in the unlocked position for a relatively long time, i.e. the element movable by the electromagnet remains unmoved, but held by the electromagnet. It has been found that the force which the electromagnet must apply to move the element driven by the electromagnet is substantially greater than the force which the electromagnet must apply to hold that element in its "held by the electromagnet" position. Of course, according to the above, this also means that the current needed to change the state is greater than the current needed to maintain the state. Of course, since the "hold state" usually lasts much longer than the actual state, a great deal of energy can be saved if the current through the electromagnet in the hold state is less than during the switching operation. In order to achieve a precisely defined switching behavior and to further minimize energy consumption and wear, the current intensity also preferably has a defined value in the second active switching state that is independent of the voltage applied to the power input. This means that also in this second active switching state, the current flowing through the electromagnet is provided by a DC-DC converter. Here, a switchable DC-DC converter can be used to realize the two active switching states. However, since the first active switching state is usually present for a much longer period of time than the second active switching state, it is not absolutely essential for energy savings compared to the prior art that the current flowing through the electromagnet in the second active switching state is provided by a DC-DC converter. The circuit must only be selected in such a way that the current strength in the second active switching state is sufficient in any case (i.e. even at low voltage of the on-board power supply) to ensure a movement of the element driven by the electromagnet.

Further advantages result from the design of the belt retractor unit according to the invention:

The control current of the solenoid naturally also requires a control voltage at the same. With the DC-DC converter, the voltage at the solenoid is independent of the vehicle battery voltage. This means that any fluctuation in the vehicle battery fluctuation can be compensated.

Although energy savings could also be achieved with a PWM controller, this has the disadvantage that it usually generates EMC-relevant interference.

However, the use of a DC current according to the invention minimizes any EMC-relevant interference, since no PWM frequencies are generated.

As already mentioned, the strength of a magnetic field of an electromagnet depends primarily on the current flow. The DC-DC converter can therefore also be used to compensate for temperature dependencies and aging ef-fects, since a constant current is always passed through the electromagnet.

Figure 4C:
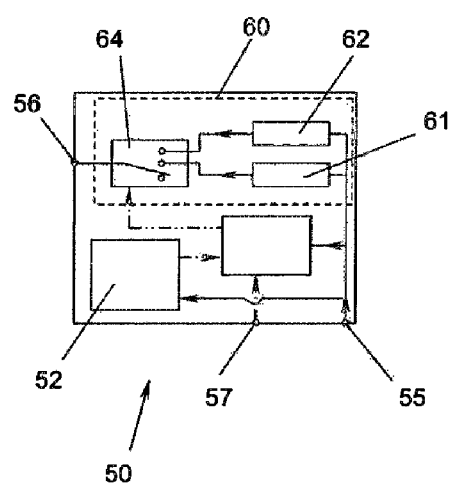
Figure 5:
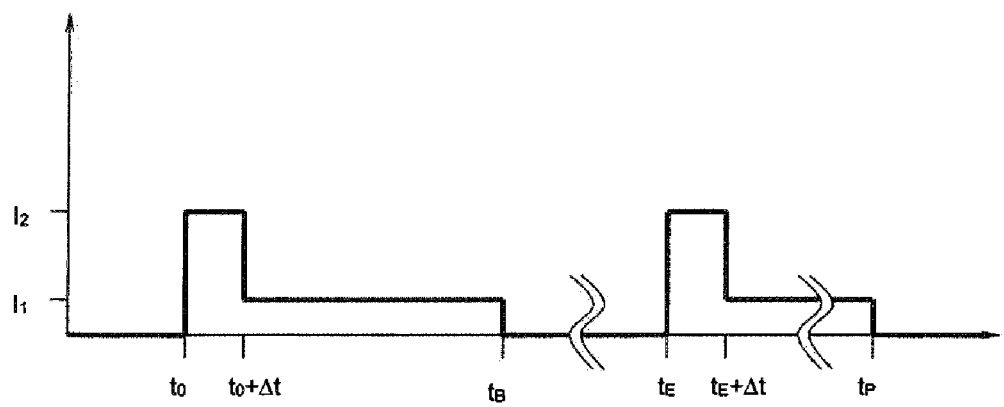

The invention will now be explained in more detail by means of a preferred embodiment with reference to the figures. In the figures:

FIG. 1 shows a schematic representation of a belt retractor unit, wherein the belt retractor of this belt retractor unit is shown in a schematic side plan view, wherein the control apparatus is in its passive switching state and wherein the belt retractor is in its locked state, FIG. 2 shows a schematic top view of the belt retractor shown in FIG. 1, FIG. 3 shows the control apparatus as shown in FIG. 1, wherein the control apparatus is in an active switching state and the belt retractor is in its unlocked state, FIG. 4a shows a more detailed representation of an embodiment of a control apparatus as simplified in FIGS. 1 and 3, wherein it is in a first active switching state, FIG. 4b shows the control apparatus of FIG. 4a, wherein it is in its second active switching state, FIG. 4c shows the control apparatus of FIGS. 4a and 4b, wherein it is in its passive switching state, and FIG. 5 shows a typical time-current diagram of the current flowing through the electromagnet of the blocking unit.

With reference to FIGS. 1 and 2, the essential features of a belt retractor unit according to the invention are first described. It should be noted here that the representations are very schematic and represent only the basic principles of the invention. The belt retractor unit may be considered to comprise the belt retractor 10 and the control apparatus 50. Here, the control apparatus 50 could be directly connected to the housing of the belt retractor 10, but need not be, which is why it is also represented as being remote from the housing in FIGS. 1 and 3. Of course, the control apparatus and belt retractor must be electrically connected to each other.

In the following, electrical conduits are represented only schematically (and not with outgoing and return conductors). Here, power lines are shown as solid lines and signal lines as lines with the pattern "dash-double-dot dash".

The belt retractor 10 comprises, as usual, a housing 10, a belt reel 20 rotatably supported in the housing, on which a portion of a strap 5 is wound, and a blocking unit for blocking the belt reel 20 in the housing 12. In the embodiment shown, the housing 12 has two housing plates 14a, 14b connected by connecting bolts 16, but this is to be understood as exemplary only. As a rule, and this is also shown here, the blocking unit has a locking wheel 22 connected in a rotationally fixed manner to the belt reel 20. A pawl 24a is further provided which, in the locked state (FIG. 1), locks the locking wheel 22 and thus the belt spool 20 against the housing 12, but not in the released state (FIG. 3).

Significantly, the position of the pawl 24a is controlled directly (as shown) or indirectly by an actuator assembly 40 having an electromagnet 42. In the embodiment shown, this influence is provided by the fact that the actuator unit 40 has, in addition to the electromagnet 42, a plunger 44 driven by the electromagnet, which acts on a lever 24 carrying the pawl 24a. When a sufficiently strong current flows through the electromagnet, it pushes the plunger 44 outward. As already mentioned, however, it should be noted that this construction is only to be understood as exemplary. Essentially, the blocking unit has an electromagnet such that the actuator unit controls the blocking unit depending on the current flow through the magnet. Usually, and this is also represented, a spring, in this case a tension spring 30, or another elastic element is provided which uniquely defines the state of the blocking unit when the electromagnet 42 of the actuator unit 40 is currentless and thus does not exert any force on the plunger driven by it. This currentless state is the locked state, as also represented in the figures.

Such electrically controlled blocking units with an electromagnet are known in the prior art. The invention therefore also relates exclusively to the controlling of the electromagnet, i.e. the control apparatus 50.

As this has been explained above, the essence of the invention is that the control apparatus 50 has at least one DC-DC converter acting as a constant current source, so that in a first active switching state of the control apparatus 50 only current of the magnitude sufficient to maintain the desired state (namely, the unlocked state) is supplied to the solenoid. As this was also explained above, the control apparatus preferably has three switching states, namely a first active switching state, a second active switching state and a passive switching state. In the passive switching state, the control apparatus does not supply any current to the electromagnet, in the first active switching state, the control apparatus supplies a current to the electromagnet whose strength has a defined first value $I_1$, and in the second active switching state, the control apparatus supplies current to the electromagnet whose current strength has a defined second value $I_2$. A possible schematic circuit diagram of such a control apparatus is shown in FIGS. 4a to 4c and is described below:

The control unit has a power input 55 connected to the vehicle's electrical system and a power output 56 connected to the electromagnet 42 of the actuator unit 40. Furthermore, the control apparatus has a signal input 57 and/or a dedicated sensor unit 52 (In the embodiment shown, both are present, but this is not mandatory), a switchable DC-DC converter 60, and a logic unit 54. The sensor unit 52 can in particular be an acceleration sensor, which then outputs a signal to a logic unit 54 when a predetermined acceleration value is exceeded or undershot. Depending on the signals received, this logic unit 54 controls the switchable DC-DC converter 60, which is capable of supplying three defined current levels to the electromagnet 42 via the power output 56, starting from the on-board voltage supplied to it via the power input 55. In the embodiment shown, the DC-DC converter 60 has a first converter unit 61 for generating the defined first current intensity with a first value $I_1$, a second converter unit 62 for generating the defined second current intensity with a second value $I_2$, and a selector switch 64 having three positions, wherein $I_2 > I_1$. The selector switch 64 is controlled by the logic unit 54. In the switching state of the selector switch 64 shown in FIG. 4a, the first transducer unit 61 supplies current to the electromagnet, in the switching state shown in FIG. 4b, the second transducer unit 62 supplies current, and in the switching state shown in FIG. 4b, the electromagnet is currentless. At least when the on-board voltage is applied to the power input 55, the switching state of the control unit corresponds to the switching state of the selector switch.

FIG. 5 shows the operation of logic unit 54 based on the current output.

When the vehicle is not in operation, the vehicle's power supply is usually switched off, and this in itself means that the electromagnet is not supplied with power, so that the belt retractor is in the state shown in FIG. 1. Alterna-tively or additionally, the selector switch may be in its switching state shown in FIG. 4c. According to the definitions chosen here, the control apparatus is in its passive switching state. If the vehicle is now put into operation, the logic unit 54 controls the selector switch 64 at a time to (for example, after the system has been tested) in such a way that it is in its switching state shown in FIG. 4b, so that current of strength 12 flows through the electromagnet 42, causing it to develop enough force to move the plunger 44 and thus bring the blocking unit into its unlocked state. After a predetermined time interval Δt (which may be less than one second) has elapsed, the logic unit 54 now controls the selector switch 64 such that it changes to the switching state shown in FIG. 4a, causing the first transducer unit 61 to supply current of magnitude $I_1$ to the electromagnet. This current $I_1$ is sufficient to keep the blocking unit in its unlocked state. If a signal indicating an accident is now fed to the logic unit 54 via the signal input 57 or by the sensor unit 54, the logic unit 54 controls the selector switch 64 in such a way that it changes to its open state (FIG. 4c), i.e. the current flow to the electromagnet 42 is interrupted and the belt retractor changes to its state shown in FIG. 1. If the signal now changes again in such a way that there is no longer an accident or a dangerous situation, what has just been described is repeated, namely first a current of strength 12 flows through the electromagnet for a time interval Δt and after this time interval has elapsed a current of strength $I_1$.

It is therefore essential that during the transition from the blocked state to the unblocked state, a stronger current always flows through the solenoid first and a weaker one in the subsequent holding state.

This results in significantly reduced power consumption overall compared with the prior art, which is a great advantage particularly with regard to vehicles that are fully or partially electrically powered.

LIST OF REFERENCE SIGNS 10 belt retractors
12 housing
14a,b housing plate
16 connecting bolts
18 holder for spring and actuator unit
20 Belt reel
22 locking wheel
24 lever
24a pawl
30 tension spring
40 actuator unit
42 electromagnet
44 plunger
50 control apparatus
52 sensor unit
54 logic unit
55 power input
56 power output
57 signal input
60 switchable DC-DC converter
61 first transducer unit
62 second transducer unit
64 selector switches

What is claimed is:

1. A belt retractor unit having
a housing,
a belt reel rotatably mounted in said housing,
a locking unit for locking the belt reel against the housing, wherein the locking unit has an actuator unit having an electromagnet, and
a control device for controlling the electromagnet, comprising a power input, a power output connected to the electromagnet, and at least one signal input for receiving a control signal, and a sensor unit for generating a control signal, wherein the control device has at least one first active switching state and one passive switching state, wherein in the first active switching state an electrical current flows between the power output and the electromagnet, the current intensity of which is greater than in the passive switching state, wherein the control device has at least one DC-DC converter acting as constant current source between the power input and the power output, so that the current intensity in the first active switching state has a defined first value independent of the voltage applied at the power input.

2. The belt retractor unit according to claim 1, wherein the first value is between 50 mA and 500 mA.

3. The belt retractor unit according to claim 1, wherein the control device has a second active switching state in which the current intensity is greater than in the first active switching state.

4. The belt retractor unit according to claim 3, wherein the second active switching state, the current intensity has a defined second value which is independent of the voltage applied to the power input and which is greater than the first value.

5. The belt retractor unit according to claim 4, wherein the second value is at least twice as great as the first value and is preferably between 150 mA and 1500 mA.

6. The belt retractor unit according to claim 3, wherein the control unit switches from the passive switching state first to the second active switching state and then to the first active switching state when the belt reel is unlocked.

7. The belt retractor unit according to claim 6, wherein the second active switching state is maintained for a time interval $\Delta t$, wherein preferably 5 ms≤$\Delta t$≤200 ms, more preferably 20 ms≤$\Delta t$≤50 ms.

8. The belt retractor unit according to claim 1, wherein the belt reel is locked against the housing when the control device is in the passive switching state.

9. The belt retractor unit according to claim 1, wherein the current intensity between the power output and the electromagnet in the passive switching state is essentially zero.

10. A vehicle with an electric drive having a belt retractor unit according to claim 1.

* * * * *